United States Patent

Haga

[11] Patent Number: 5,630,134
[45] Date of Patent: May 13, 1997

[54] INTER-PROCESSOR EXCLUSIVE CONTROL APPARATUS FOR ENABLING ONE OF A PLURALITY OF PROCESSORS EXECUTE AN EXECUTABLE UNIT PROCESS

[75] Inventor: Yutaka Haga, Kawasaki, Japan

[73] Assignee: Fujitsu Limited, Japan

[21] Appl. No.: 214,308

[22] Filed: Mar. 17, 1994

[30] Foreign Application Priority Data

Jun. 11, 1993 [JP] Japan ................................. 5-140404

[51] Int. Cl.$^6$ .................................................. G06F 13/00
[52] U.S. Cl. ............................................. 395/676; 395/680
[58] Field of Search ................................... 395/650, 700, 395/680, 676; 364/DIG. 1

[56] References Cited

U.S. PATENT DOCUMENTS 5,251,318  10/1993  Nitta et al. ........................... 395/725
5,408,652  4/1995   Hayashi et al. ....................... 395/600

FOREIGN PATENT DOCUMENTS 55-6666   1/1980   Japan .
62-282359 12/1987  Japan .
2-77868   3/1990   Japan .

Primary Examiner—Kevin A. Kriess
Assistant Examiner—Majid A. Banakhah
Attorney, Agent, or Firm—Staas & Halsey

[57] ABSTRACT

A multiprocessor system employs an inter-processor exclusive control apparatus. The inter-processor exclusive control apparatus has local areas formed in local memories, respectively, or in a shared memory, to store exclusive control data, as well as a shared area formed in the shared memory, to store exclusive control data. Executable unit processes manipulated by the multiprocessor system are optionally divided into groups that are associated with the local areas, respectively. The local memories are accessible only by the executable unit processes in the corresponding groups. The shared memory is shared by these groups. Each of the local areas manages exclusive requests from the corresponding executable unit processes. The shared area manages exclusive requests from the groups. Since the exclusive requests from the executable unit processes are managed by both the local areas and shared area, the number of accesses to the shared area is decreased because the shared area is accessible only by the groups. As a result, the system achieves exclusive control at high speed.

8 Claims, 14 Drawing Sheets

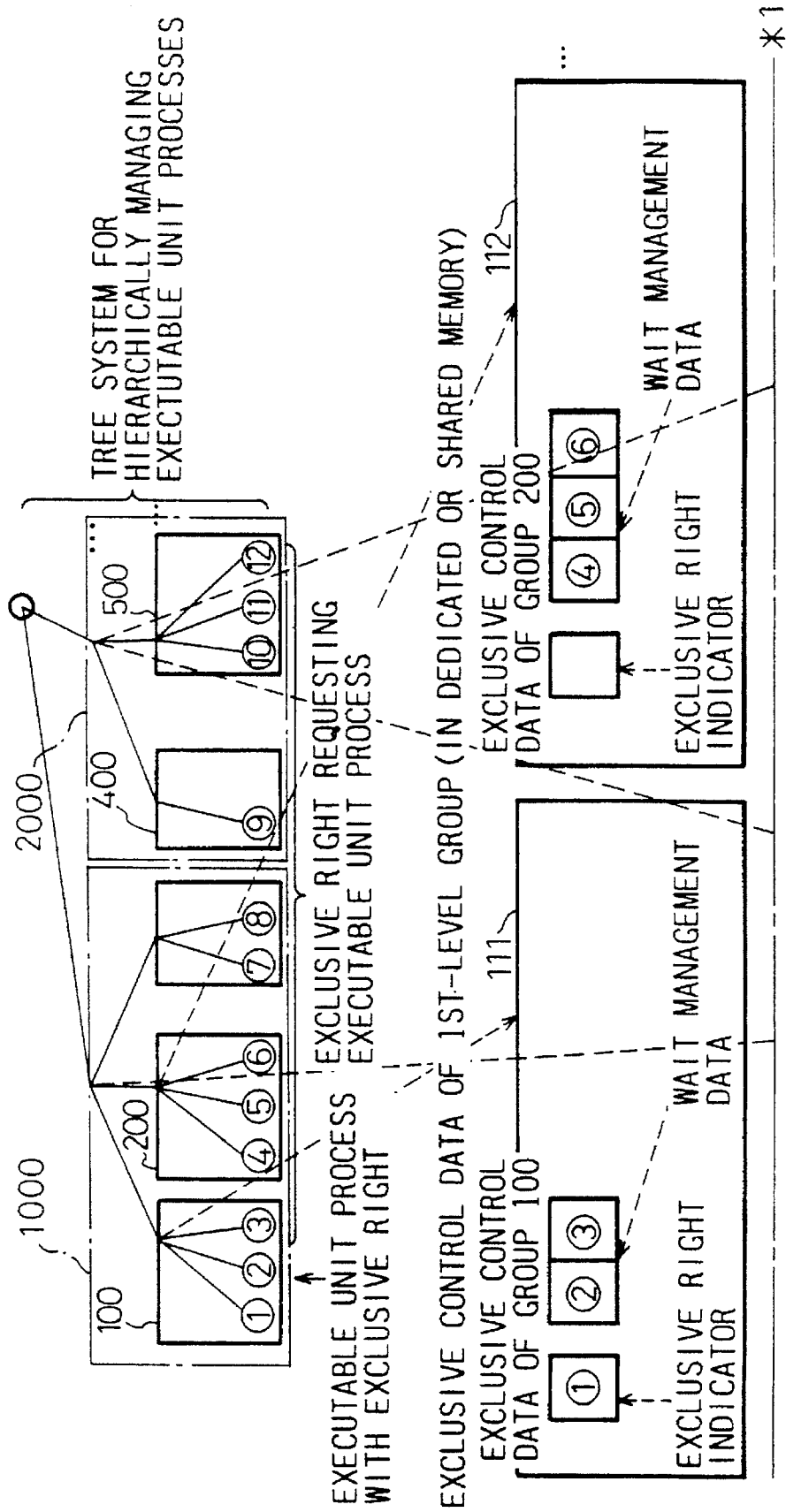

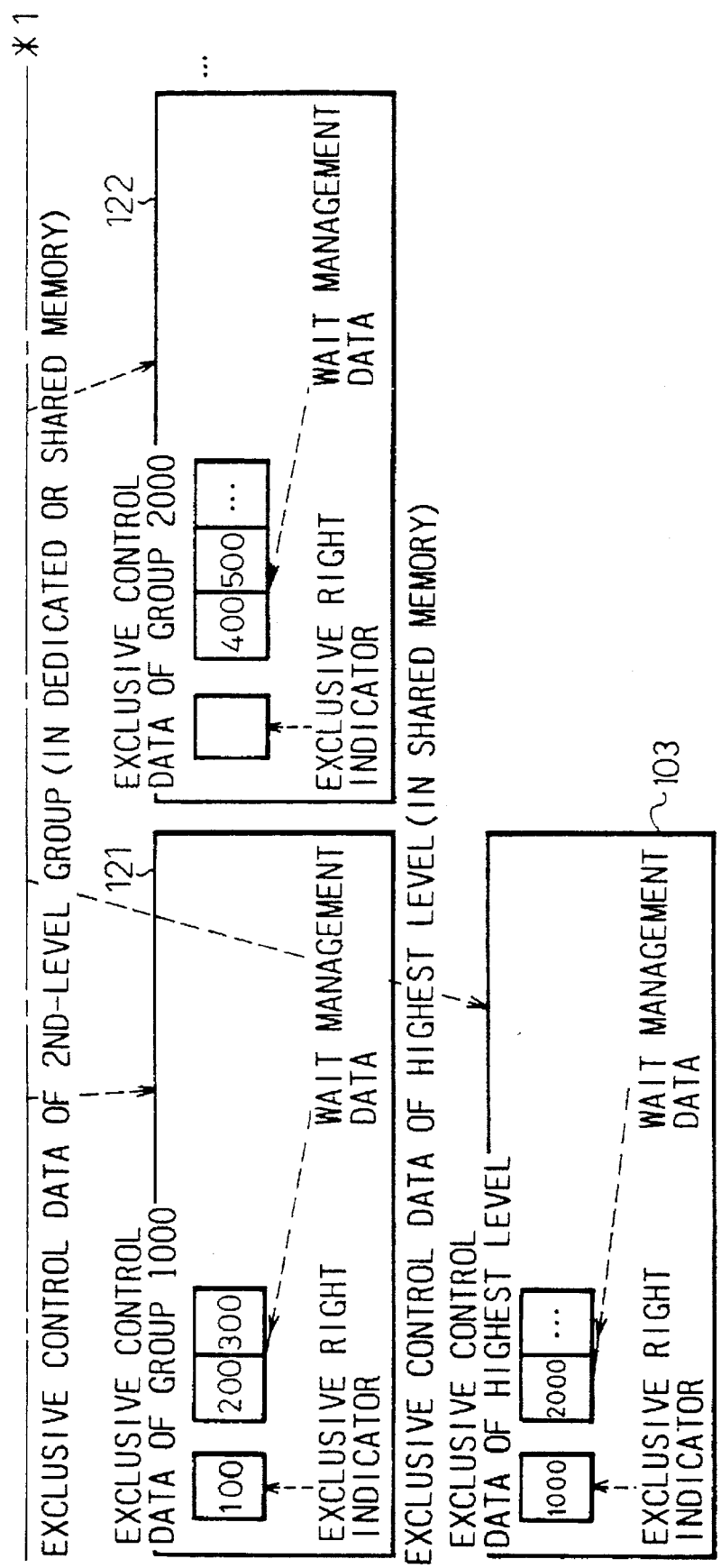

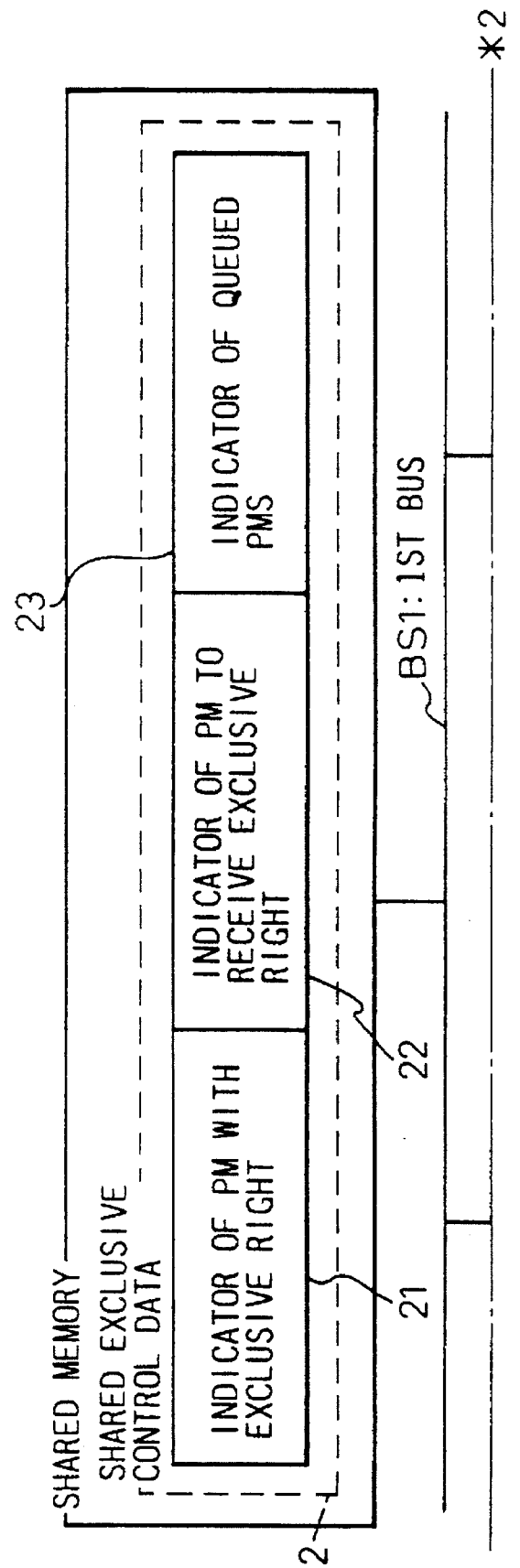

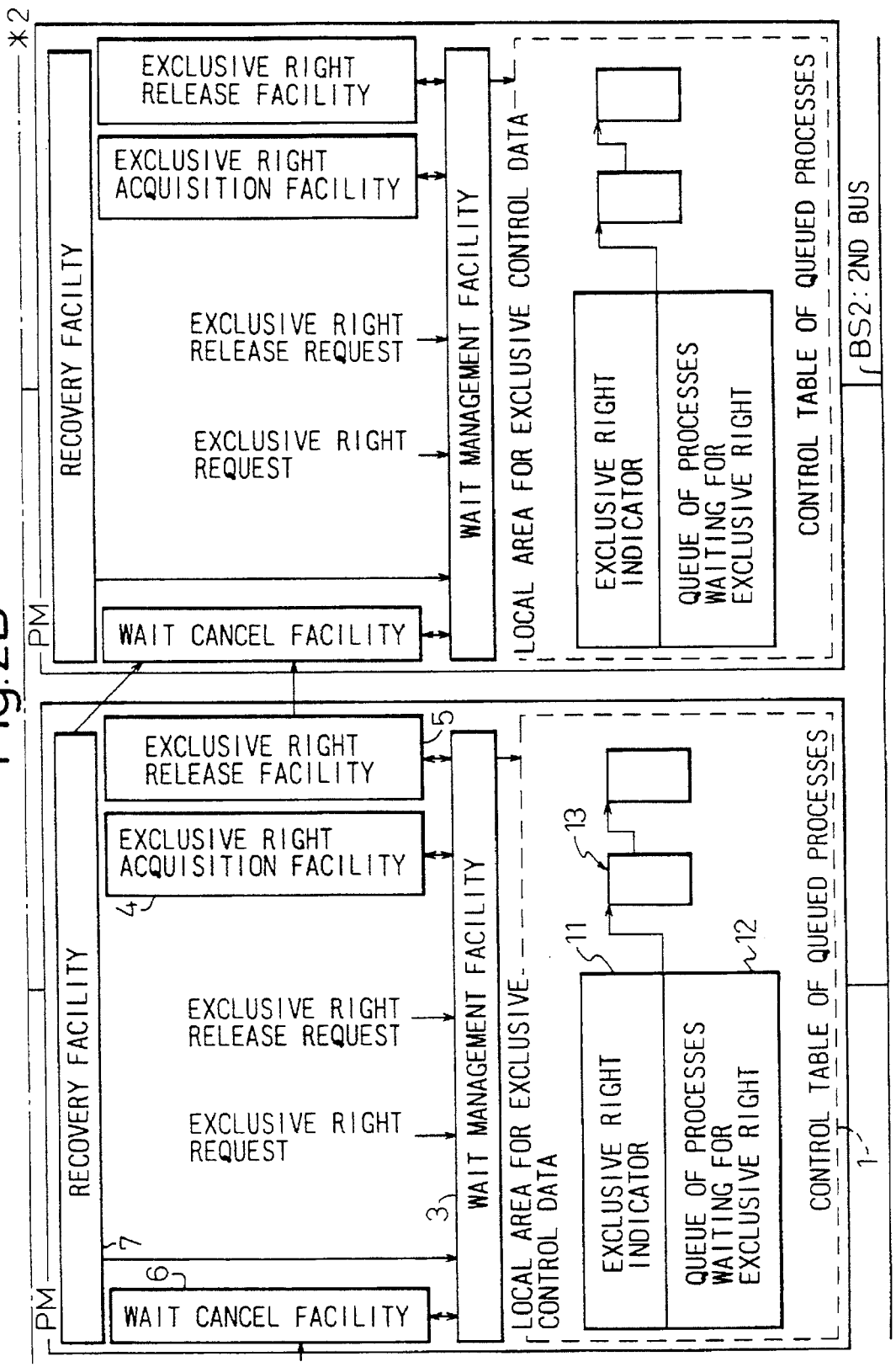

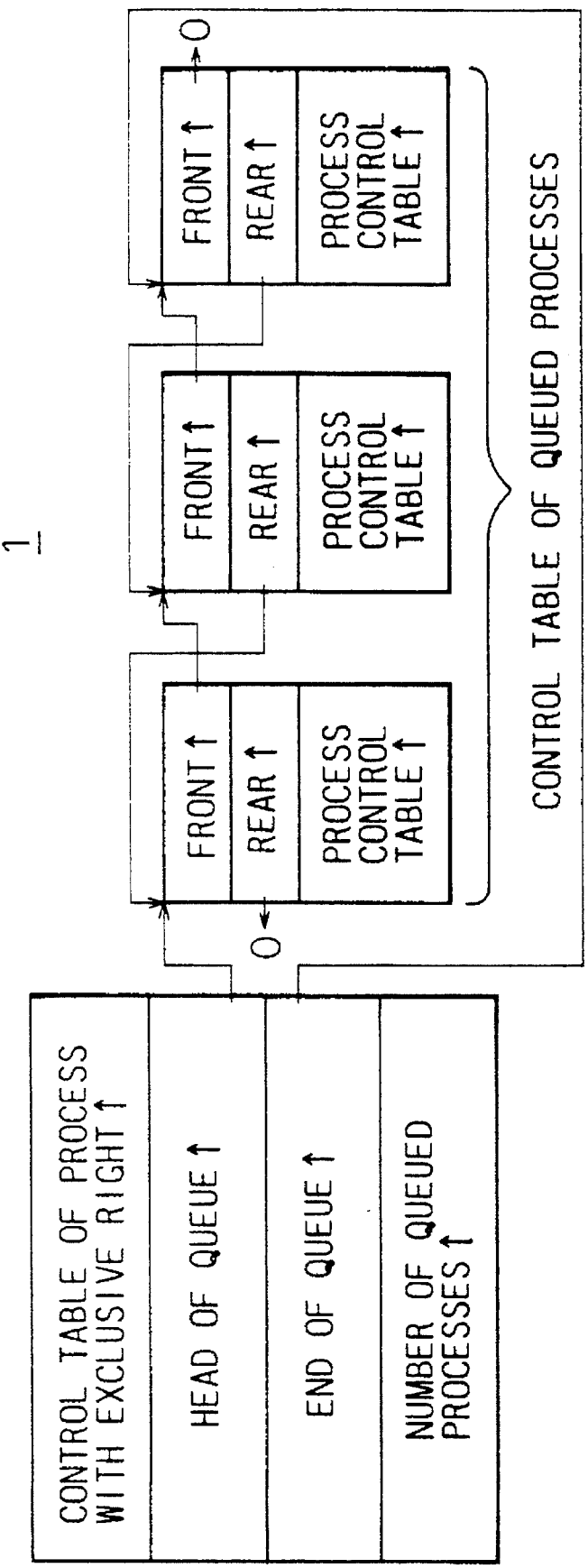

INTER-PROCESSOR EXCLUSIVE CONTROL APPARATUS FOR ENABLING ONE OF A PLURALITY OF PROCESSORS EXECUTE AN EXECUTABLE UNIT PROCESS

BACKGROUND OF THE INVENTION

1. Field of the Invention

The present invention relates to an inter-processor exclusive control apparatus for a multiprocessor system, and more particularly, to an inter-processor exclusive control apparatus (including processors) for carrying out exclusive control of executable unit processes in a multiprocessor system employing a plurality of processors.

2. Description of the Related Art

To improve a processing speed, some computer systems employ a plurality of processors. These multiprocessor systems must carry out exclusive control so that a resource may be shared by processes executed by a plurality of processors, or must arrange that a process is exclusively executed apart from other processes.

To carry out the exclusive control, the multiprocessor systems usually employ an exclusive control server for centrally controlling exclusive requests from executable unit processes, or a spin lock method (which is also called a busy waiting method) that is a simple exclusive control facility. The problems with these conventional techniques will be explained later.

Multiprocessor systems require a high-speed exclusive control facility. To improve the reliability of the systems, the systems particularly require an exclusive control facility that is capable of continuously executing processes even if some of the processors fail.

SUMMARY OF THE INVENTION

An object of the present invention is to provide a method of, and an apparatus for, carrying out exclusive control at high speed among a plurality of processors to minimize contention among the processors, as well as to easily carry out a recovery process if some of the processors fail.

Another object of the present invention is to provide a method of, and an apparatus for, carrying out inter-processor exclusive control in a multiprocessor system to uninterruptedly carry out processes, even if some processors fail, to thereby improve the performance and reliability of the system.

According to the present invention, there is provided an inter-processor exclusive control apparatus for letting one of a plurality of processors execute an executable unit process to exclusively manipulate a resource or an instruction procedure apart from other executable unit processes executed by the other of the processors, wherein the inter-processor exclusive control apparatus comprises a plurality of local areas for managing exclusive control data, formed in a memory shared by the processors, the executable unit processes being optionally divided into groups that are associated with the local areas, respectively, exclusive requests from the executable unit processes in a given one of the groups being managed by a corresponding one of the local areas; and a shared area for managing exclusive control data, formed in the shared memory, the shared area managing exclusive requests from the groups, wherein the number of accesses to the shared area are decreased because exclusive requests from the executable unit processes are managed by both the local areas and the shared area, and because the shared area is accessed only by the groups.

Further, according to the present invention, there is also provided a multiprocessor system having a plurality of processors, a memory shared by the processors, and an inter-processor exclusive control apparatus for letting one of the processors execute an executable unit process to exclusively manipulate a resource or an instruction procedure apart from other executable unit processes executed by the other of the processors, wherein the inter-processor exclusive control apparatus comprises a plurality of local areas for managing exclusive control data, formed in the shared memory, the executable unit processes being optionally divided into groups that are associated with the local areas, respectively, exclusive requests from the executable unit processes in a given one of the groups being managed by a corresponding one of the local areas; and a shared area for managing exclusive control data, formed in the shared memory, the shared area managing exclusive requests from the groups, wherein the number of accesses to the shared area are decreased because exclusive requests from the executable unit processes are managed by both the local areas and the shared area, and because the shared area is accessed only by the groups.

The groups of the executable unit processes may be further grouped and managed in a tree structure, the groups may be provided with exclusive control data areas, respectively, formed in the shared memories that are accessible only by the groups, the exclusive control data areas managing exclusive requests from the executable unit processes in the respective groups, execution requests to higher groups being hierarchically transmitted. The inter-processor exclusive control apparatus may further comprises local memories dedicated to the processors, the local memories may be accessible only by the corresponding groups, and the local areas may be formed in the local memories, respectively.

The executable unit processes may be grouped so that an executable unit process in a given group is terminated if a corresponding one of the processors fails; the local areas may be removed or disabled if a corresponding one of the processors fails, the local areas managing exclusive requests from executable unit processes in the respective groups; the shared area for managing exclusive requests from the groups may be formed in the shared memory that is always available even if some of the processors fail; only the shared area may be accessed if one of the processors fails and if the executable unit process group corresponding to the failed processor is holding an exclusive right or has issued an exclusive request, to transfer the exclusive right to another group, or cancel the exclusive request; and the remaining non-failing processors may continuously operate even if some of the processors fail, to eliminate the need of withdrawing management resources related to the failed processors.

BRIEF DESCRIPTION OF THE DRAWINGS

The present invention will be more clearly understood from the description of the preferred embodiments as set forth below with reference to the accompanying drawings, wherein:

FIGS. 1A and 1B are a block diagram explaining a principle of an inter-processor exclusive control apparatus according to the present invention;

FIGS. 2A and 2B are a block diagram showing an example of a multiprocessor system according to the present invention;

FIG. 3 shows an example of a local area for exclusive control data in the multiprocessor system of FIGS. 2A and 2B;

DESCRIPTION OF THE PREFERRED EMBODIMENTS

Figure 4:
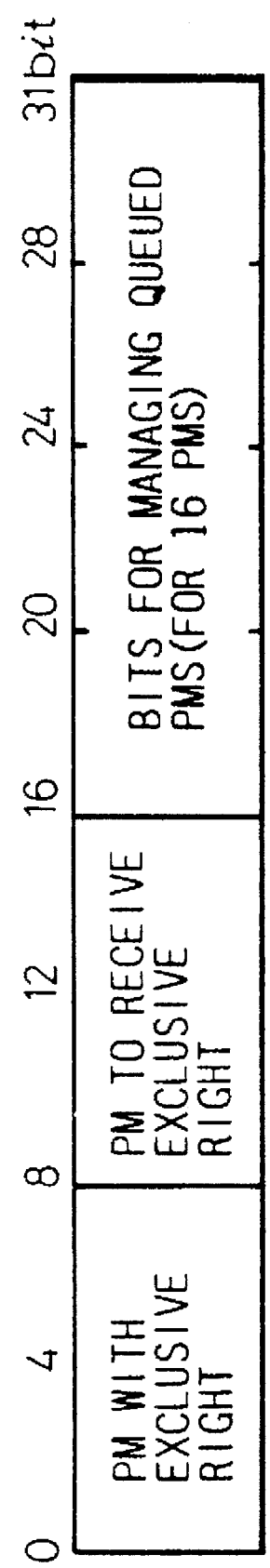
FIG. 4 shows an example of a shared area for exclusive control data in the multiprocessor system of FIGS. 2A and 2B.

For a better understanding of the preferred embodiments of the present invention, the problems in the prior art will be explained.

A multiprocessor system has a high processing speed. The multiprocessor system includes a plurality of processors, a memory shared by the processors, and/or memories dedicated to the processors, respectively. The multiprocessor system must carry out exclusive control on executable unit processes.

For this purpose, the multiprocessor system employs, for example, an exclusive control server to centrally control exclusive requests from the executable unit processes, or a spin lock method (busy waiting method) that is a simple exclusive control facility.

The exclusive control server constantly requires communication overhead with respect to the executable unit processes that issue exclusive requests. The server must accumulate the exclusive requests to centrally manage them. When a given executable unit process is completed, an exclusive request from this process must be cancelled. A large amount of exclusive request data must be protected or duplicated against a failure of the server.

The spin lock method sets a lock word in memory shared by the processors. When a given executable unit process acquires an exclusive right, the method sets an exclusive right indicator in the lock word. When releasing the exclusive right, the method removes the indicator. As will be explained later, the lock word is usually updated with an inseparable instruction that compares the contents of the lock word with a specified value and updates the contents with another specified value.

The exclusive control server centrally manages exclusive requests in the multiprocessor system, so that the server must send and receive data to and from a plurality of processors that involve executable unit processes to issue exclusive requests. This results in increasing the communication overheads, to thereby reduce the performance of the system. The server must accumulate the exclusive requests to manage them, and therefore, it must have a facility for withdrawing an exclusive request when an executable unit process that has issued the exclusive request is completed, or when a processor involving an executable unit process that has requested the exclusive request fails. To prepare for an abnormality of the server or a failure of a processor operating as the server, a large amount of exclusive request data must be protected or duplicated, so that a standby server may continue operations if such an abnormality or a failure occurs.

The spin lock method (busy waiting method) reduces the performance of the processors of the multiprocessor system if contention frequently occurs among the processors. While a given executable unit process keeps an exclusive right indicator in the lock word, another executable unit process must repeatedly try to update the lock word until it successfully sets its own exclusive right indicator. During this period CPU resources are idle and this reduces the performance of the system. If the processors are connected to a shared memory through a bus, the instruction to update the lock word exclusively uses the bus preventing other processors from using the bus and so reducing the efficiency of the bus.

Now, a method of, and an apparatus for, carrying out inter-processor exclusive control in a multiprocessor system according to preferred embodiments of the present invention will be explained with reference to the drawings.

FIGS. 1A and 1B show a block diagram explaining a principle of the inter-processor exclusive control apparatus according to the present invention.

Executable unit processes are divided into first-level groups 100, 200, 300, 400, and 500. The first-level group 100 has an exclusive control data area 111 for managing exclusive requests from the executable unit processes in the group 100. The first-level group 200 has an exclusive control data area 112 for managing exclusive requests from the executable unit processes in the group 200. These exclusive control data areas 111 and 112 are formed in dedicated memories accessed only by the corresponding groups, or in a shared memory.

The first-level groups 100 to 500 are further grouped into second-level groups 1000 and 2000. The second-level group 1000 has an exclusive control data area 121 for managing exclusive requests from the first-level groups 100, 200, and 300. The second-level group 2000 has an exclusive control data area 122 for managing exclusive requests from the first-level groups 400 and 500. These areas 121 and 122 are formed in dedicated memories accessed only by the corresponding second-level groups, or in the shared memory. An exclusive control data area 103 manages exclusive requests from the second-level groups 1000 and 2000.

Although the embodiment shown in FIGS. 1A and 1B groups executable unit processes into the first-level groups, and the first-level groups into the second-level groups, the grouping may be optionally carried out. For example, the second-level groups may be further grouped.

Each of the exclusive control data areas has an exclusive right indicator representing one executable unit process or lower group that is holding an exclusive right, as well as wait management data showing executable unit processes or lower groups that have issued exclusive requests. In FIG. 1A, the exclusive right indicator in the data area 111 shows an executable unit process (1) having the exclusive right. The wait management data show executable unit processes (2) and (3) that have issued exclusive requests and are waiting for the exclusive right. The wait management data in the data area 112 show executable unit processes (4), (5), and (6) that have issued exclusive requests and are waiting for the exclusive right.

An optional scheduling logic is employable to manage the executable unit processes waiting for the exclusive right in each group. For example, the exclusive right may be given in order of the issuance of the exclusive requests, or at random. The wait management data may employ a queue structure or a bit map control table.

The example shown in FIGS. 1A and 1B employs a tree structure for hierarchically managing exclusive requests from the executable unit processes. Namely, the exclusive control data areas are related to one another in the tree structure, to manage the respective executable unit processes. When a given executable unit process issues an exclusive request, the exclusive control data areas are accessed from the lowest level in the tree. Only when the wait management data in the exclusive control area at the lowest level are empty, the exclusive control data area at a higher level is accessed. The exclusive control data area of the highest level is lastly accessed so that the given executable unit process may acquire the exclusive right.

When the exclusive right is released from the given executable unit process and is assigned to another executable unit process, the exclusive control data areas are accessed from the highest level, to select a lower group to which the exclusive right is given according to the exclusive control data in the exclusive control data area. Thereafter, an executable unit process to which the exclusive right is assigned is selected.

FIGS. 2A and 2B show a block diagram showing an example of a multiprocessor system according to the present invention. Although the figure shows only two processor modules (PMs), more PMs may be arranged in practice. Each of the PMs has a processor and a dedicated memory, and the multiprocessor system has a memory shared and accessed by the PMs. The system also has a first bus BS1 and a second bus BS2.

The dedicated memory has a local area 1 for exclusive control data. The local area 1 includes an exclusive right indicator 11 to indicate whether or not a corresponding PM is holding an exclusive right, as well as a process (an executable unit process) that is holding the exclusive right. The local area 1 also includes a queue pointer 12 for managing processes waiting for the exclusive right and control tables for managing queued processes.

The shared memory has a shared area 2 for exclusive control data. The shared area 2 includes an indicator 21 to indicate a PM with the exclusive right, an indicator 22 to indicate a PM to which the exclusive right is to be transferred, and an indicator 23 to indicate PMs waiting for the exclusive right.

Each of the PMs has a wait management facility 3, an exclusive right acquisition facility 4, an exclusive right release facility 5, a wait cancel facility 6, and a recovery facility 7.

Processes carried out in the respective parts of the multiprocessor system shown in FIGS. 2A and 2B will be explained.

FIG. 3 shows an example of the local area 1 for exclusive control data. FIG. 4 shows an example of the shared area 2 for exclusive control data.

Referring to FIG. 4, the shared area 2 is made of a word (four bytes) capable of exclusively controlling 16 PMs at the maximum. The shared area 2 is updated with a small number of instruction steps. Namely, the shared area 2 is updated with a compare swap (CS) instruction that executes a process of comparing the contents of the word with a specified value, and if they agree with each other, updating the word with another specified value.

Figure 5:
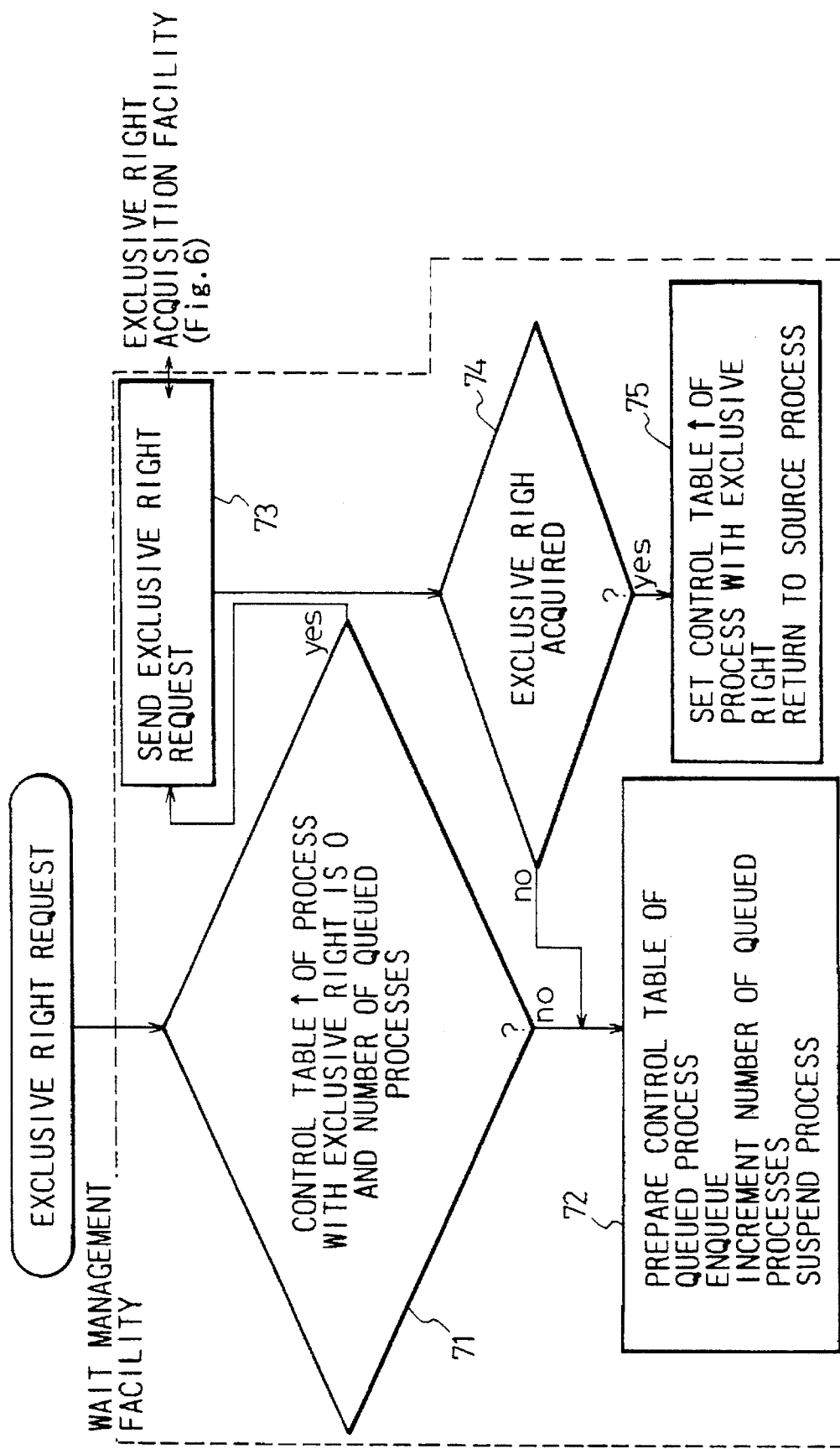
FIG. 5 shows an example of an exclusive right acquisition process carried out by a wait management facility in the multiprocessor system of FIGS. 2A and 2B.
Figure 6:
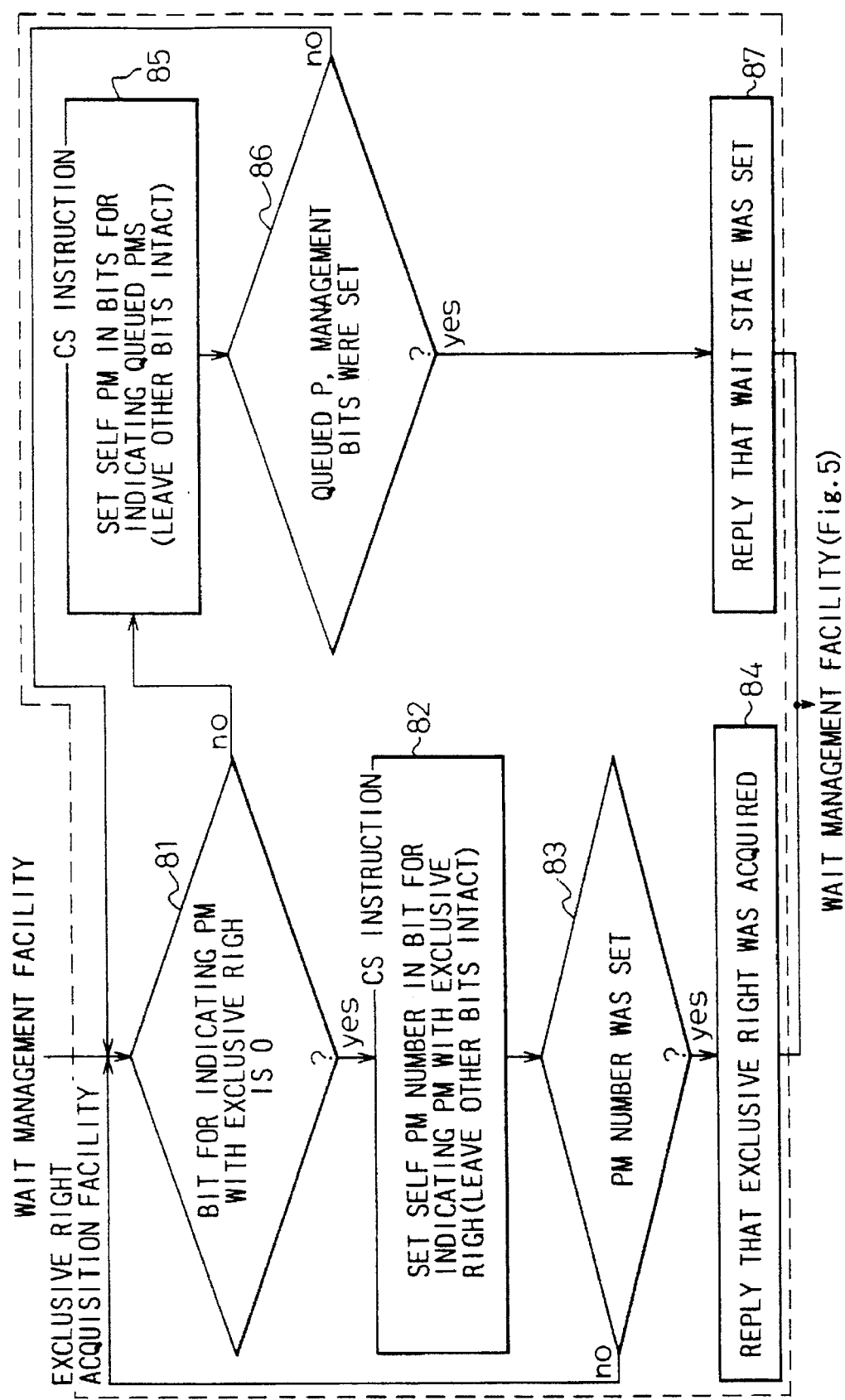
FIG. 6 shows an example of an exclusive right acquisition facility in the multiprocessor system of FIGS. 2A and 2B.

FIG. 5 shows an example of an exclusive right acquisition process carried out by the wait management facility 3 of the multiprocessor system of FIGS. 2A and 2B. FIG. 6 shows an example of the exclusive right acquisition facility 4 of the multiprocessor system of FIGS. 2A and 2B. Steps 82 and 85 of FIG. 6 correspond to the compare swap (CS) instruction.

Referring to FIG. 5, the wait management facility 3 receives an exclusive right request from a process and examines the queue 12 in the local area 1. In step 71, the wait management facility 3 determines whether or not the control table "T" of an exclusive right holding process is 0 and the number of queued processes is 0. If the control table "T" is 0 and if there is no queued process, i.e., if the result of step 71 is YES, step 73 sends an exclusive request to the exclusive right acquisition facility 4. If the result of step 71 is NO, step 72 suspends the process that has issued the exclusive request, prepares the control table 13 of a queued process, and enqueues to the queue 12. After the step 72, another process is serviced.

Step 74 determines whether or not an exclusive right has been acquired. If it has been acquired, step 75 sets a control table "T" for the exclusive right holding process and returns to the process that has issued the exclusive request. If no exclusive right has been acquired, the flow goes to step 72 to execute the steps mentioned above.

In step 81 of FIG. 6, the exclusive right acquisition facility 4 accesses the shared area 2 and determines whether or not the indicator 21 to indicate a processor module (PM) having the exclusive right is 0. If the indicator 21 is 0, the facility 4 sets, in step 82, the PM number (other than 0) of its own in the indicator 21. If the indicator 21 is not 0, the facility 4 sets, in step 85, the PM number of its own in the indicator 23 to indicate queued PMs. Step 83 determines whether or not the PM number has been set in the indicator 21. If it has been set, the facility 4 informs, in step 84, the wait management facility 3 that the exclusive right has been acquired. If the step 83 provides NO, the step 81 is again carried out. Step 86 determines whether or not the PM number has been set in the indicator 23. If it has been set, the facility 4 informs, in step 87, the wait management facility 3 that the exclusive request is in a wait state.

In this way, the exclusive right acquisition facility 4 informs the wait management facility 3 of a result of the exclusive right acquisition process. If the exclusive right is acquired, the facility 3 sets the exclusive right indicator 11 in the local area 1 and returns to the process that has issued the exclusive request. If no exclusive right is acquired, the execution of the process that has issued the exclusive request is suspended and the control table 13 for managing the queued process is set to enqueue to the queue 12.

Figure 7:
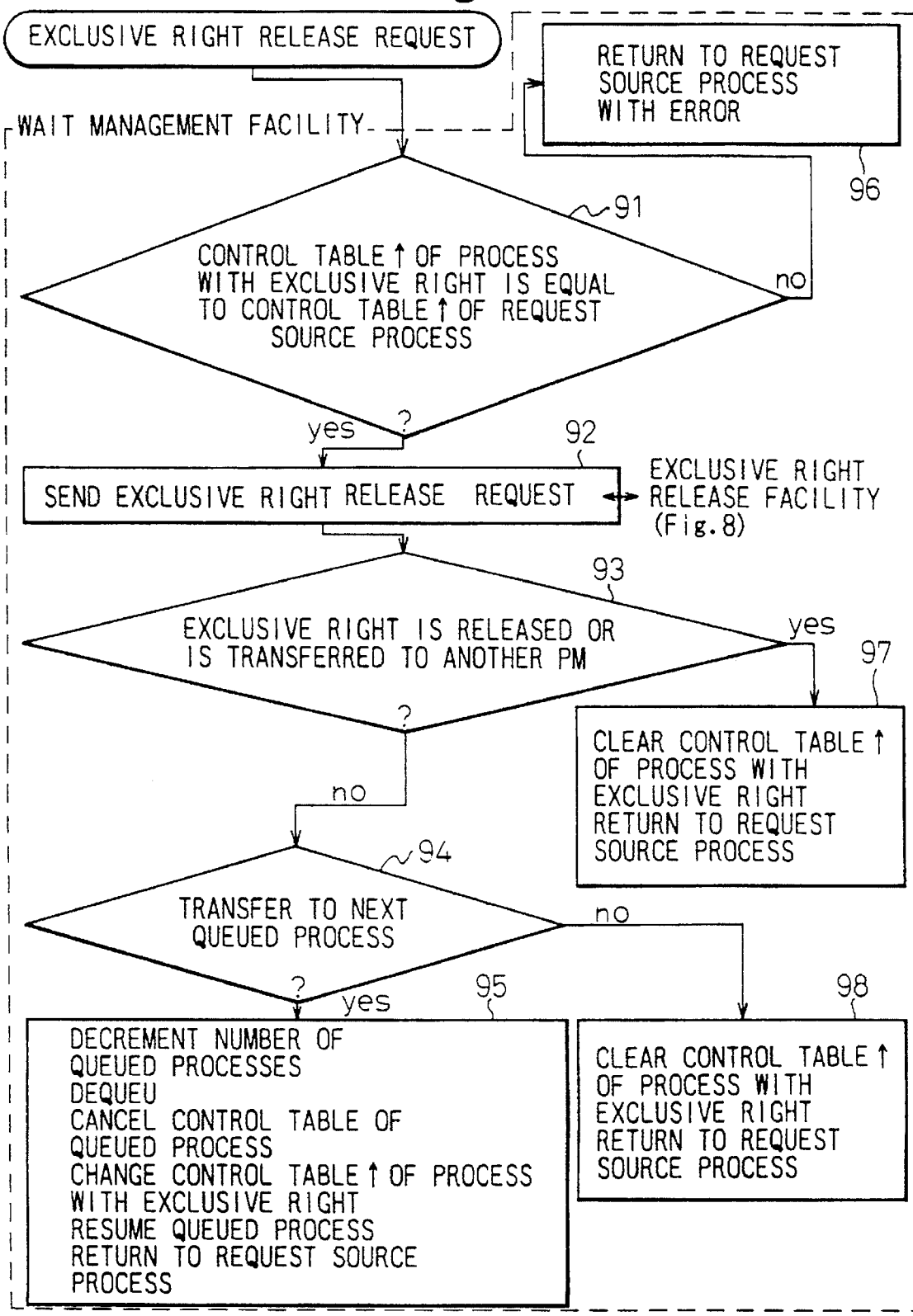
FIG. 7 shows an example of an exclusive right release process carried out by the wait management facility in the multiprocessor system of FIGS. 2A and 2B.
Figure 8:
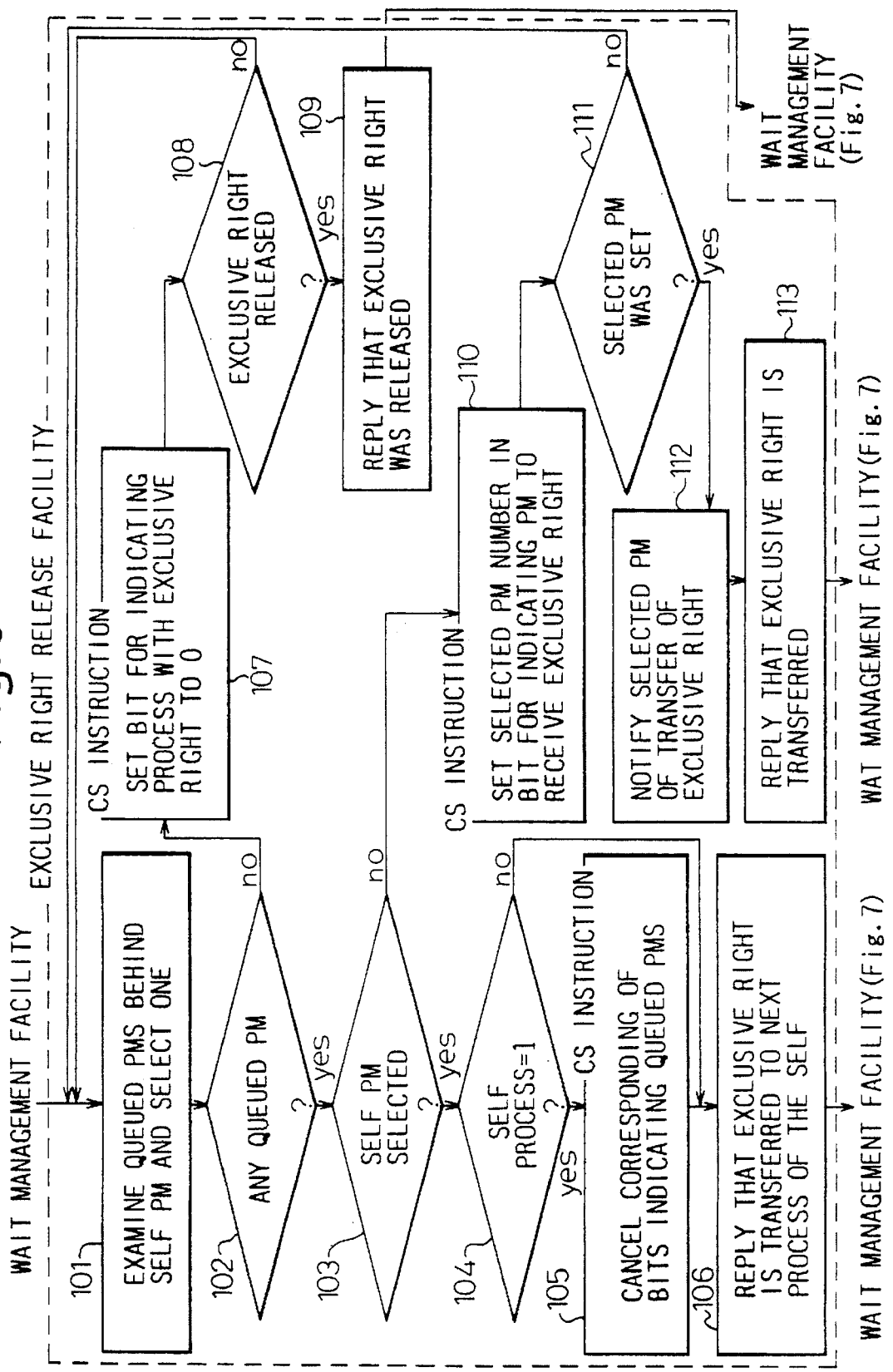
FIG. 8 shows an example of an exclusive right release facility in the multiprocessor system of FIGS. 2A and 2B.

FIG. 7 shows an example of an exclusive right release process carried out by the wait management facility 3 of the multiprocessor system of FIGS. 2A and 2B. FIG. 8 shows an example of the exclusive right release facility 5 of the multiprocessor system of FIGS. 2A and 2B. Steps 105, 107, and 110 of FIG. 8 correspond to the CS instruction.

Referring to FIG. 7, the wait management facility 3 receives an exclusive right release request from a process and examines the exclusive right indicator 11 in the local area 1. In step 91, the facility 3 determines whether or not the control table "T" of the exclusive right holding process is equal to the control table "T" of the request source process. If the release request is correctly from the exclusive right holding process, the step 91 provides YES. Accordingly, the exclusive right release facility 5 sends, in step 92, an exclusive right release request. If the step 91 provides NO, step 96 returns to the request source process with an error.

Step 93 determines whether or not the exclusive right must be released or transferred to another processor module (PM). If it must be released or transferred to another PM, step 97 clears the control table "↑" of the exclusive right holding process and returns to the request source process. If the exclusive right is not released nor transferred to another PM, step 94 determines whether or not the exclusive right must be transferred to the next queued process.

If the exclusive right is not transferred to the next queued process, step 98 clears the control table "↑" of the exclusive right holding process and returns to the request source process. If the exclusive right is transferred to the next queued process, step 95 decreases the number of queued processes, dequeues the queued process control table, releases the queued process control table, changes the control table "↑" of the exclusive right holding process, resumes the execution of the queued process, and returns to the request source process.

Referring to FIG. 8, the exclusive right release facility 5 sequentially checks, in step 101, the indicator 23 in the shared area 2 for PM numbers lower than the PM number of its own, to select one of the queued PMs. Step 102 determines whether or not there is a queued PM. If there is a queued PM, step 103 determines whether or not the PM of its own is selected. If the PM of its own is selected, step 104 determines whether or not the number of processes of its own is 1. If it is 1, step 105 cancels a corresponding bit in the indicator 23 indicating the queued PMs. The facility 5 informs, in step 106, the wait management facility 3 that the exclusive right is transferred to the next queued process.

If the step 102 determines that there is no queued PM in the indicator 23, step 107 sets 0 in the indicator 21. Step 108 determines whether or not the indicator 21 has been cleared. If YES, step 109 reports to the wait management facility 3 that the exclusive right has been released. If the step 108 provides NO, the flow returns to the step 101. If the step 103 determines that the PM of its own is not selected, step 110 sets the number of a PM to which the exclusive right is going to be transferred in the indicator 22.

Step 111 determines whether or not the indicator 22 has been set with the PM number. If YES, step 112 informs the selected PM of the transfer of the exclusive right. Step 113 reports to the wait management facility 3 that the exclusive right will be transferred. If the step 111 provides NO, the flow returns to the step 101.

In this way, the exclusive right release facility 5 examines the indicator 23 for managing queued PMs in the shared area 2. If there are queued PMs in the indicator 23, one of them is selected, and the number of the selected PM is set in the indicator 22. The transfer of the exclusive right is informed to the wait cancel facility 6 of the PM in question. If the selected PM selected by itself (or the previously selected PM) and if there is only one queued process in the selected PM, the indicator 23 is cleared. If there is no queued PM, the exclusive right indicator 21 is cleared. The exclusive right release facility 5 replies to the wait management facility 3 about the results of these processes. When the exclusive right is transferred to another PM or is released, the wait management facility 3 clears the exclusive right indicator 11 in the local area 1, and control is returned to the request source process. At this time, a proper process may be selected according to the queue 12 for managing processes waiting for the exclusive right and the exclusive right may be given to the selected process. Thereafter, the execution of the process is resumed, the queued process control table 13 is released, and control is returned to the request source process.

Figure 9:
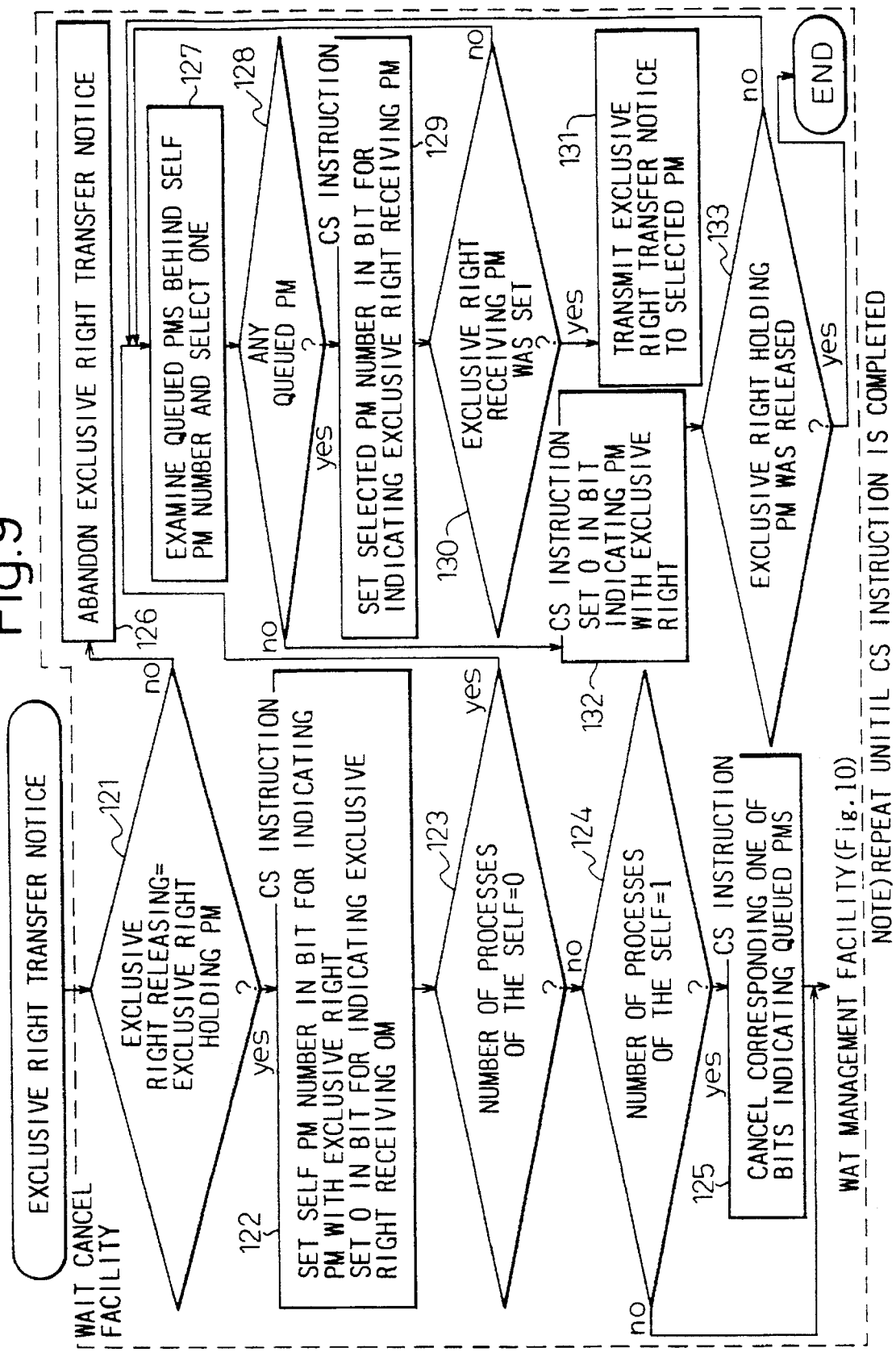
FIG. 9 shows an example of a wait cancel facility in the multiprocessor system of FIGS. 2A and 2B.

FIG. 9 shows an example of the wait release facility 6 of the multiprocessor system of FIGS. 2A and 2B. Steps 122, 125, 129, and 132 correspond to the CS instruction.

The wait release facility 6 receives an exclusive right transfer notice, and in step 121, determines whether or not the exclusive right releasing processor module (PM) is equal to the exclusive right holding PM. If NO, step 126 abandons the exclusive right transfer notice. If the step 121 provides YES, step 122 sets the number of the PM in the indicator 21 and 0 in the indicator 22. Step 123 determines whether or not the number of queued processes related to the PM is 0. If it is not 0, step 124 determines whether or not it is 1. If it is 1, step 125 clears corresponding one of the bits in the indicator 23. If it is not 1, step 125 is jumped, and a request of resuming a proper process is directly sent to the wait management facility 3.

If the step 123 determines that the number of the queued processes is 0, step 127 sequentially examines the indicator 23 for PM numbers lower than the PM number in question, to select one of the queued PMs. Step 128 determines whether or not there is a queued PM. If there is, step 129 sets the selected PM number in the indicator 22 indicating an exclusive right receiving PM. Step 130 determines whether or not the exclusive right receiving PM has been successively set. If YES, step 131 sends an exclusive right transfer notice to the selected PM.

If the step 128 determines there is no queued PM, step 132 sets 0 in the indicator 21 indicating an exclusive right holding PM. Step 133 determines whether or not the exclusive right holding PM has been released. If NO, the flow returns to the step 127, and if YES, the flow ends.

In this way, the wait release facility 6 receives an exclusive right transfer notice, cancels the indicator 22 indicating an exclusive right receiving PM in the shared area 2, and sets the self PM number in the indicator 21 indicating an exclusive right holding PM, to thereby acquire the exclusive right. If there is only one queued process in the PM in question, a corresponding bit in the indicator 23 indicating queued PMs is cleared, and the wait management facility 3 is requested to resume a proper process.

Figure 10:
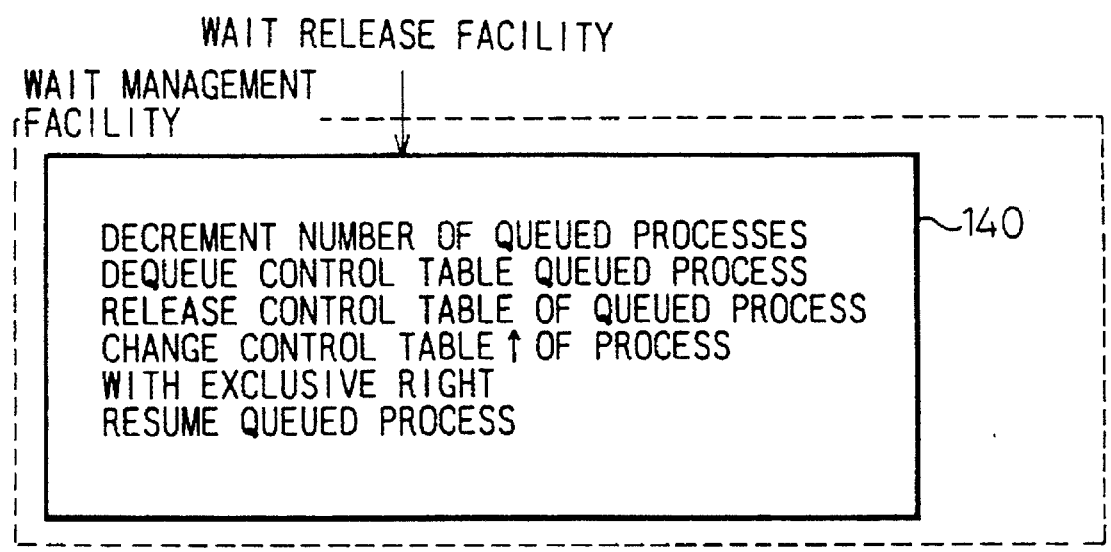
FIG. 10 shows an example of a wait release and recovery process carried out by the wait managing facility in the multiprocessor system of FIGS. 2A and 2B.

FIG. 10 shows an example of a wait release and recovery process carried out by the wait management facility 3 in the multiprocessor system of FIGS. 2A and 2B. Upon receiving a process from the wait release facility 6 of FIG. 9, the wait management facility 3 decreases the number of queued processes, dequeues the queued process control table, releases the queued process control table, changes the control table "↑" of an exclusive right holding process, and resumes the execution of the queued process.

Figure 11A:
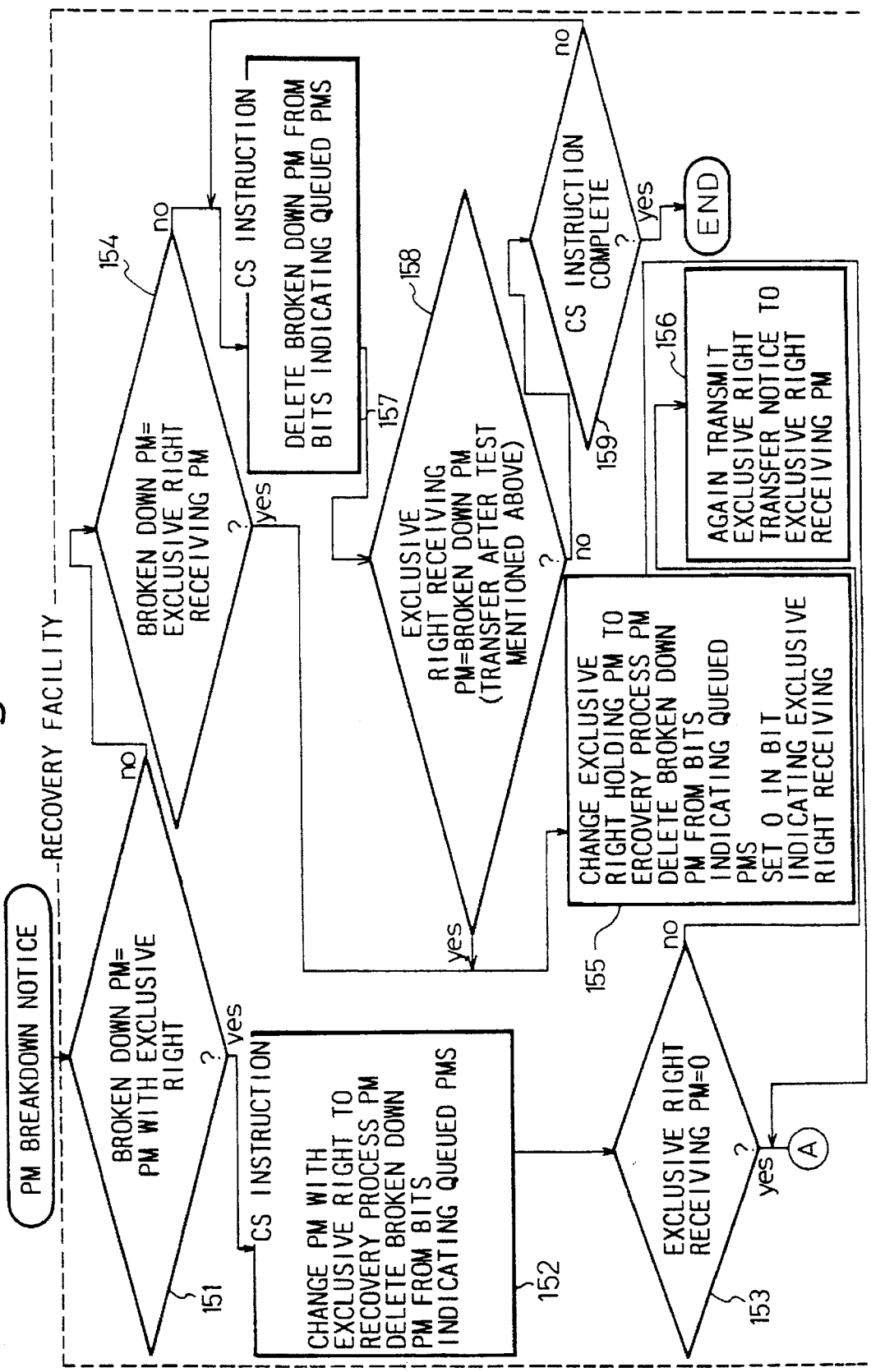
FIGS. 11A and 11B show an example of a recovery facility in the multiprocessor system of FIGS. 2A and 2B.
Figure 11B:
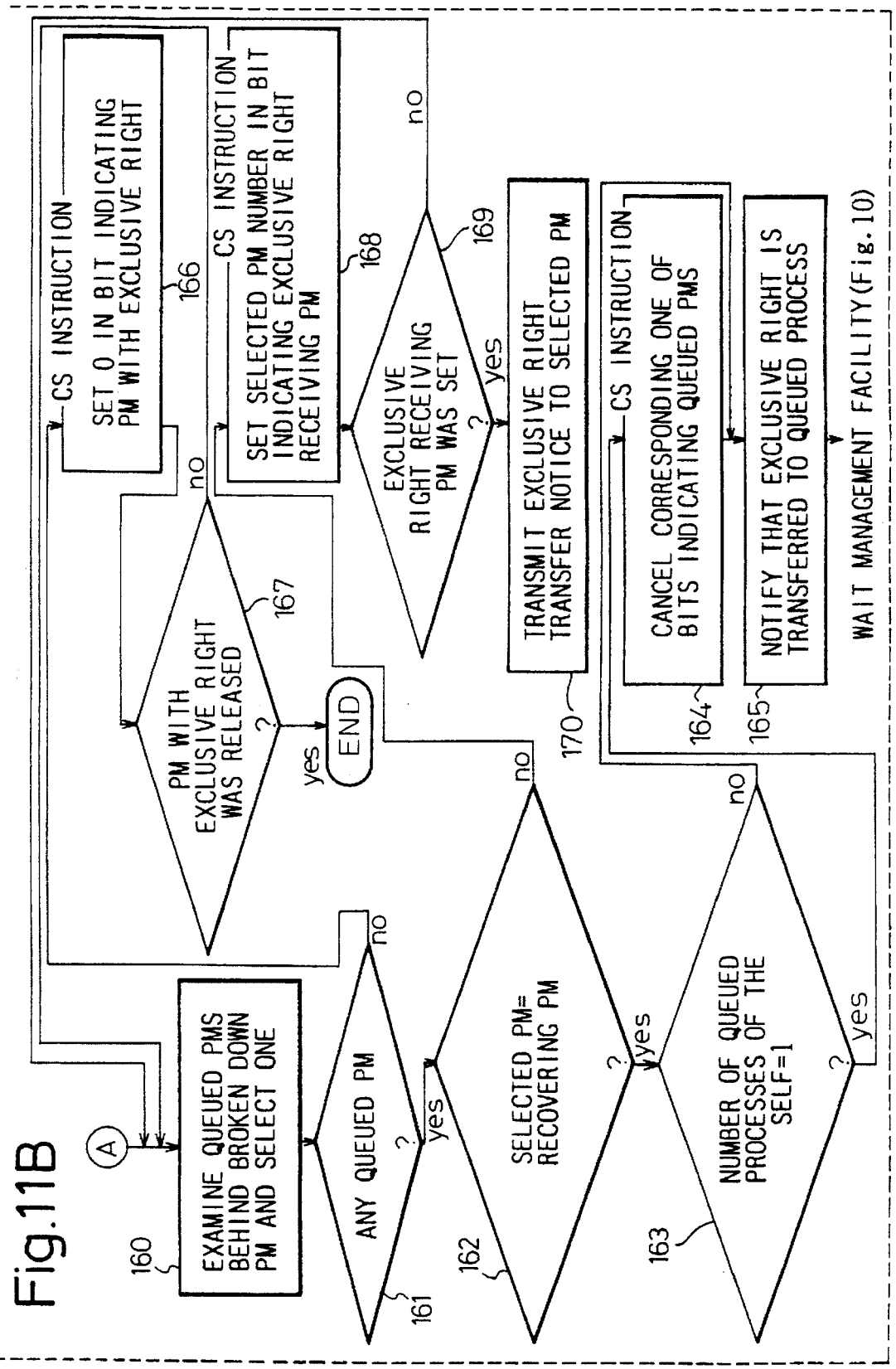

FIGS. 11A and 11B show an example of the recovery facility 7 in the multiprocessor system of FIGS. 2A and 2B. Steps 152, 155, 157, 164, 166, and 168 correspond to the CS instruction.

The recovery facility 7 receives a PM failure notice, and in step 151, determines whether or not the failed PM is equal to an exclusive right holding PM. If YES, step 152 changes the exclusive right holding PM to a recovery process PM and erases a corresponding one of the bits of the indicator 23 indicating queued PMs. Step 153 determines whether or not the indicator 22 indicating an exclusive right receiving PM is 0. If it is not 0, step 156 again transmits the exclusive right transfer notice to the exclusive right receiving PM, and if it is 0, step 160 is carried out.

If the step 151 determines that the failed PM is not the exclusive right holding PM, step 154 determines whether or not the failed PM is equal to the exclusive right receiving PM. If YES, step 155 changes the exclusive right holding PM to the recovery process PM, erases a bit corresponding to the failed PM in the indicator 23, and sets 0 in the indicator 22. If the step 154 provides NO, step 157 erases the bit corresponding to the broken down PM in the indicator 23.

Step 158 determines whether or not the exclusive right receiving PM is equal to the broken down PM. If YES, step 155 is carried out, and if NO, step 159 determines whether or not the CS instruction has been successfully carried out. If YES, the flow ends, and if NO, the flow returns to the step 157.

The step 160 sequentially examines the indicator 23 for queued PMs behind the broken down PM and selects one. Step 161 determines whether or not there is a queued PM. If there is, step 162 determines whether or not the selected PM is equal to the recovery process PM. If YES, step 163 determines whether or not the number of queued processes in the PM is 1. If it is 1, step 164 releases a bit of the indicator 23 corresponding to the PM, and if it is not 1, step 165 is directly carried out. The step 165 informs the wait management facility 3 that the exclusive right is transferred to the queued process, and the flow returns to the wait management facility 3.

If the step 161 determines that there is no queued PM, step 166 sets 0 in the indicator 21 indicating an exclusive right holding PM. Step 167 determines whether or not the exclusive right holding PM has been released. If the step 167 provides YES, the flow ends, and if NO, the flow returns to the step 160.

If the step 162 determines that the selected PM is not equal to the recovery process PM, step 168 sets the selected PM number in the indicator 22 indicating an exclusive right receiving PM. Step 169 determines whether or not the exclusive right receiving PM has been set. If the step 169 provides YES, an exclusive right transfer notice is transmitted to the selected PM, and if NO, the flow returns to the step 160.

In this way, if a failure occurs in a processor module (PM), the recovery facility 7 receives a failure notice for the PM and examines the shared area 2. If it is found in the shared area 2 that the failed PM is holding the exclusive right or is going to receive the exclusive right, another queued PM is selected to which the exclusive right transfer process is repeated. If a bit representing the failed PM is set in the indicator 23 indicating queued PMs, the bit is cleared.

As explained above, the inter-processor exclusive control apparatus according to the present invention divides executable unit processes into groups. Exclusive requests from the executable unit processes are managed group by group. The groups are further grouped into larger groups, and exclusive requests from the groups are managed among the larger groups. Exclusive control data are stored in dedicated memories accessed by the groups, respectively, or in a memory shared by the groups. This arrangement minimizes accesses to the shared memory used for carrying out exclusive control over the processors, to thereby improve the performance of the exclusive control. Since the exclusive control data are distributed, it becomes easy to carry out a recovery process and an uninterrupted operation when some of the processors fail.

As explained above in detail, the method of, and apparatus for, carrying out inter-processor exclusive control in a multiprocessor system according to the present invention minimizes contention for exclusive control data among processors and carrys out exclusive control at high speed.

The present invention enables a recovery process to be easily carried out if some of the processors fail. In addition, if such a failure occurs, the present invention employs the other processors to continue operations, to thereby improve the performance and reliability of the system.

Many different embodiments of the present invention may be constructed without departing from the spirit and scope of the present invention, and it should be understood that the present invention is not limited to the specific embodiments described in this specification, except as defined in the appended claims.

I claim:

1. An inter-processor exclusive control apparatus for enabling one of a plurality of processors to execute an executable unit process to exclusively manipulate a resource or an instruction procedure apart from other executable unit processes executed by the other of said processors, wherein said inter-processor exclusive control apparatus comprises:

a plurality of local areas for managing exclusive control data, formed in a memory shared by said plurality of processors, said plurality of executable unit processes being optionally divided into a plurality of groups that are associated with said plurality of local areas, respectively, exclusive requests from said plurality of executable unit processes in a corresponding one of said plurality of groups being managed by a corresponding one of said plurality of local areas, said plurality of groups of said executable unit processes being further grouped and managed in a tree structure, said further groups being provided with exclusive control data areas, respectively, formed in said shared memories that are accessible only by said further groups, said exclusive control data areas managing exclusive requests from said executable unit processes in the respective groups, execution requests to higher groups being hierarchically transmitted; and a shared area for managing exclusive control data, formed in said shared memory, said shared area managing exclusive requests from said plurality of groups, thereby decreasing a number of accesses to said shared area by both said local areas and said shared area managing exclusive requests from said executable unit processes and by only said plurality of groups accessing said shared area.

2. An inter-processor exclusive control apparatus as claimed in claim 1, wherein said inter-processor exclusive control apparatus further comprises local memories dedicated to said processors, said local memories are accessible only by the corresponding groups, and said local areas are formed in said local memories, respectively.

3. An inter-processor exclusive control apparatus as claimed in claim 2, wherein said plurality of groups of said executable unit processes are further grouped and managed in a tree structure, said further groups are provided with exclusive control data areas, respectively, formed in said local memories that are accessible only by said further groups, said exclusive control data areas managing exclusive requests from said executable unit processes in the respective groups, execution requests to higher groups being hierarchically transmitted.

4. An inter-processor exclusive control apparatus as claimed in claim 1, wherein:

said executable unit processes are grouped so that an executable unit process in a given group are terminated if a corresponding one of said processors fails;

said local areas are removed or disabled if a corresponding one of said processors fails, said local areas managing exclusive requests from executable unit processes in the respective groups;

said shared area for managing exclusive requests from said groups is formed in said shared memory that is always available even if some of said processors fail;

only said shared area is accessed if one of said processors fails and if said executable unit process group corresponding to said failed processor is holding an exclusive right or has issued an exclusive request, to transfer the exclusive right to another group, or cancel said exclusive request; and the remaining non-failing processors continuously operate even if some of said processors fail, to eliminate the need of withdrawing management resources related to said failed processors.

5. A multiprocessor system having a plurality of processors, a memory shared by said processors, and an inter-processor exclusive control apparatus for enabling one of said processors to execute an executable unit process to exclusively manipulate a resource or an instruction procedure apart from other executable unit processes executed by the other of said processors, wherein said inter-processor exclusive control apparatus comprises:

a plurality of local areas for managing exclusive control data, formed in said shared memory, said plurality of executable unit processes being optionally divided into a plurality of groups that are associated with said plurality of local areas, respectively, exclusive requests from said plurality of executable unit processes in a corresponding one of said plurality of groups being managed by a corresponding one of said plurality of local areas, said plurality of groups of said executable unit processes being further grouped and managed in a tree structure, said further groups being provided with exclusive control data areas, respectively, formed in said shared memories that are accessible only by said further groups, said exclusive control data areas managing exclusive requests from said executable unit processes in the respective groups, execution requests to higher groups being hierarchically transmitted; and a shared area for managing exclusive control data, formed in said shared memory, said shared area managing exclusive requests from said plurality of groups, thereby decreasing a number of accesses to said shared area by both said local areas and said shared area managing exclusive requests from said executable unit processes and by only said plurality of groups accessing said shared area.

6. A multiprocessor system as claimed in claim 5, wherein said inter-processor exclusive control apparatus further comprises local memories dedicated to said processors, said local memories are accessible only by the corresponding groups, and said local areas are formed in said local memories, respectively.

7. A multiprocessor system as claimed in claim 6, wherein said plurality of groups of said executable unit processes are further grouped and managed in a tree structure, said further groups are provided with exclusive control data areas, respectively, formed in said local memories that are accessible only by said further groups, said exclusive control data areas managing exclusive requests from said executable unit processes in the respective groups, execution requests to higher groups being hierarchically transmitted.

8. A multiprocessor system as claimed in claim 5, wherein:

said executable unit processes are grouped so that an executable unit process in a given group is terminated if a corresponding one of said processors fails;

said local areas are removed or disabled if a corresponding one of said processors fails, said local areas managing exclusive requests from executable unit processes in the respective groups;

said shared area for managing exclusive requests from said groups is formed in said shared memory that is always available even if some of said processors fail;

only said shared area is accessed if one of said processors fails and if said executable unit process group corresponding to said failed processor is holding an exclusive right or has issued an exclusive request, to transfer the exclusive right to another group, or cancel said exclusive request; and the remaining non-failing processors continuously operate even if some of said processors fail, to eliminate the need of withdrawing management resources related to said failed processors.

* * * * *